United States Patent

[11] 3,608,789

[72] Inventor Willem H. Willemsen
 83, Westervalge, Warffum, Netherlands
[21] Appl. No. 872,966
[22] Filed Oct. 31, 1969
[45] Patented Sept. 28, 1971
[32] Priority Nov. 14, 1968
[33] Netherlands
[31] 6816249

[54] APPARATUS FOR PREPARING PUREE OR A SIMILAR PRODUCT
 3 Claims, 2 Drawing Figs.
[52] U.S. Cl. ....................................................... 222/391, 222/146 H
[51] Int. Cl. ........................................................ G01f 11/00
[50] Field of Search ........................................... 222/146, 309, 372, 378, 380, 249, 250, 386, 391, 509, 382; 74/25, 125.5; 53/363, 364, 365

[56] References Cited
UNITED STATES PATENTS
| | | | |
|---|---|---|---|
| 1,896,750 | 2/1933 | Maas | 222/391 X |
| 2,726,802 | 12/1955 | Jones | 222/391 X |
| 2,912,143 | 11/1959 | Woolfolk | 222/146 HE X |
| 3,143,636 | 9/1964 | Lupovici | 222/146 HE X |

Primary Examiner—Robert B. Reeves
Assistant Examiner—Larry Martin
Attorney—Stevens, Davis, Miller & Mosher ABSTRACT: An apparatus for preparing and extruding puree such that exactly equal portions are dispensed. The apparatus has a piston which may be operated by a lever through a displacement mechanism. The lever stroke is limited by a stop. In a preferred embodiment the stop is adjustable and also relieves the pressure on the puree at the end of the lever stroke, thereby preventing the spilling of puree when the apparatus is inoperative as well as demixing of the puree.

PATENTED SEP 28 1971 3,608,789

APPARATUS FOR PREPARING PUREE OR A SIMILAR PRODUCT

This invention relates to an apparatus for preparing puree or a similar product, comprising at least one mixing reservoir with a discharge valve, a piston being adapted to be pushed downwards in said reservoir by means of a lever in order to extrude the puree through said discharge valve.

Such apparatus are known, but they have the drawback of the dispensed portions of the product not being exactly equal. A known apparatus operates for example with a pawl mechanism so that the stroke of the piston depends on the tooth engaged by the pawl.

The invention aims at providing a simple apparatus dispensing exactly equal portions as long as the stroke of the lever is kept constant.

This is accomplished according the the invention in that the lever acts on the piston rod of the piston via a displacement block of a displacement mechanism operating by wedge action and including a displacement block and a clamping block, the casing of said mechanism being fixedly mounted in vertical direction and the stroke of said lever and therefore of the piston being limited by a stop provided on the clamping block against which a projection of the displacement block abuts.

An advantage of the apparatus according to the invention is furthermore that on account of the fact that upon operation of the lever the projection of the displacement block abuts against the stop the clamping block is automatically moved into the nonclamping position so that at the end of the lever stroke, therefore after the dispensing of a portion, the pressure on the puree is removed. In this way during operation of the apparatus one may leave the discharge valve of the mixing reservoir open while nevertheless, still no puree will run out in the period between two operations of the lever. Moreover, the elimination of the pressure in these periods is favorable because if the puree remains under pressure for a longer period the water separates from the solid matter so that demixing of the puree would take place. As a result of the elimination of the pressure on the puree the compressed puree mass recoils a few millimeters this free stroke being traversed by the piston in opposite sense when the lever is operated again and the clamping block being moved again from the nonclamping into the clamping position.

In order to be able to change the size of the portions it is preferred to make the stop adjustable.

In a preferred embodiment according to the invention the stop means on the clamping block consists of a small rod extending downwards from said clamping block and passing through the projection, having the shape of an eye, of the displacement block situated below the clamping block and comprising below said eye a part of greater thickness.

The part of greater thickness on the small rod is preferably a nut with a locking nut screwed on said rod.

In order to be able, after the complete extrusion of the contents of a mixing reservoir, to move the piston again into its uppermost position ready for the extrusion of a refilled reservoir this invention contemplates that in the casing of the displacement mechanism for the piston rod there is mounted a second lever which on being operated moves the clamping block of the displacement mechanism into the nonclamping position.

When preparing the puree it is of importance to add the correct amount of water to a predetermined amount of puree powder. Moreover, for the desired structure of the puree it is necessary to mix it at a predetermined temperature and to keep it at that temperature.

This is accomplished according to the invention in that the apparatus comprises a liquid-dosing container with heating means and thermostat.

It is preferable to use two or more mixing reservoirs simultaneously so that water can be heated and puree be mixed in one reservoir while portions are dispensed from the other mixing reservoir which results in a saving of time with continuous production.

This may be obtained with the apparatus according to the invention if the casing of the displacement mechanism for the piston rod including the rod and piston is mounted in the apparatus for horizontal swiveling movement connected to a swiveling arm.

The invention will be explained below with reference to the drawings showing by way of example an embodiment of the apparatus according to the invention.

Figure 1:
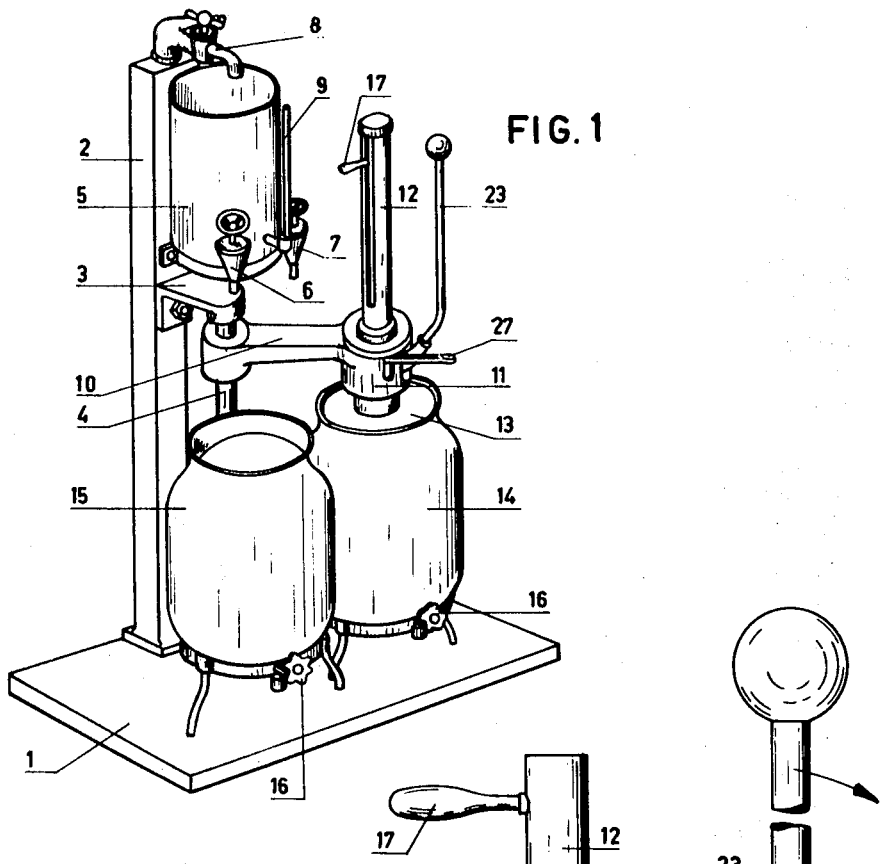
FIG. 1 shows a view in perspective of the apparatus.

The apparatus as shown comprises a base plate 1 on which a column 2 has been mounted. A support 3 has been secured to the column, in which support a shaft 4 extending downwards is rotatably mounted, said shaft being rotatably mounted with its other end in the base plate in a manner not shown. The support 3 furthermore carries a liquid-dosing container 5 comprising heating means (not shown), for example an electric resistance element of 4 kw. with a thermostat, set at 80° C.

In the embodiment as shown the apparatus comprises two discharge taps 6, 7 for discharging heated water from the liquid dosing container 5 into mixing reservoirs to be mentioned further on. Above the liquid dosing container 5 there is mounted to the column 2 a water service tap 8 with a connection (not shown) to the mains, said tap serving to supply water to the container 5. To said container 5 there is connected a gauge glass 9 with a mark for measuring the correct quantity of water in container 5. In case the container is transparent the mark may also be provided on the container itself and the gauge glass may be omitted.

On the shaft 4 there is fixedly mounted a swiveling arm 10 carrying a casing 11 at its other end. A piston rod 12 extends through said casing, a piston 13 being attached to the lower end of said piston rod. This piston is contained in a mixing reservoir 14 which is mounted together with a second mixing reservoir 15 near the column 2 on the base plate 1. Each of the mixing reservoirs 14, 15 have a discharge valve 16 for the extrusion of the puree which may be extruded onto a plate placed under the reservoir which stands on small legs. The piston rod 12 carries at its upper end a transverse handle 17 by means of which the piston rod 12 may be moved into its highest position which is the initial position for starting the extrusion from a full reservoir 14.

Figure 2:
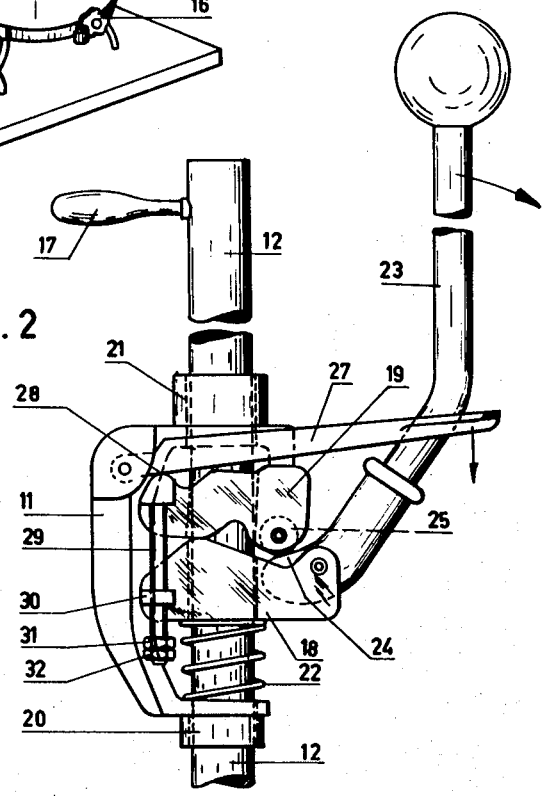
FIG. 2 shows a diagrammatical section through the displacement mechanism.

The casing 11 a known lifting mechanism comprises the displacement mechanism for the rod 12. This mechanism is diagrammatically shown in FIG. 2 and comprises a swingable clamping block 19 and a displacement block 18 both gripping with clearance around the rod 12, a screw pressure spring 22 being arranged between the lower end of the casing 11, which comprises two guides 20, 21 for the rod 12, and the lower side of the block 18. In the displacement block 18 there is mounted a lever 23 with an operating projecting part 24 abutting against a roller 25 rotatably mounted in the clamping block 19. If in FIG. 2 the lever 23 is swung towards the right, the projecting part 24 pushes against the roller 25 so that consequently the block 18 clamps itself on the rod 12 and this rod 12 together with the block 18 is moved downwards against the action of the spring 22. When the lever 23 is released, the spring 22 urges the lever 23, via the block 18 and the projecting part 24, back into its inoperative position.

On the clamping block 19 there is provided a stop means consisting in the embodiment shown of a small rod 29 fixedly connected to the clamping block 19 and extending downwards, thereby passing through an eye 30 of the displacement block 18 and terminating in a threaded portion on which a nut 31 and a locking nut 32 are provided. Upon operation of the lever 23 the displacement block 18 is moved in downward direction so that at the end of the stroke the eye 30 abuts against the nut 31 thus limiting the stroke. The length of stroke may be adjusted with the nuts 31, 32. On account of the connection of the small rod 29 with the clamping block 19 and when the eye 30 contacts the nut 31 the block 19 is moved into nonclamping position so that the pressure on the puree is removed.

To the casing 11 there is secured a second lever 27 which upon downward movement abuts with a cam 28 against the block 19 so that consequently this is moved into the nonclamping position. Subsequently the piston rod 12 may be moved upwards by means of the handle 17 after the mixing reservoir 14 has been emptied so that one may start emptying a full reservoir by extrusion.

In the embodiment shown after the emptying of the reservoir 14 by extrusion the arm 10 may be swung to above the reservoir 15 in which meanwhile by supplying water from the dosing container 5 and the addition of puree powder puree has been prepared by stirring so that the extrusion may be continued at once from the reservoir 15.

I Claim:

1. An apparatus for preparing puree or a similar product, comprising at least one mixing reservoir with a discharge valve, a piston being adapted to be pushed downwards in said reservoir by means of a lever in order to extrude the puree through said discharge valve, wherein the lever acts on said piston rod of the piston via a displacement block of a displacement mechanism operating by wedge action and including a displacement block and a clamping block, the casing of said mechanism being fixedly mounted in vertical direction and the stroke of said lever and therefore of the piston being limited by a stop provided on said clamping block, consisting of small rod extending downwards from said clamping block and passing through a projection, having the shape of an eye, of said displacement block situated below the clamping block and comprising below said eye a part of greater thickness, said projection abutting against said stop at the end of the lever stroke.

2. An apparatus according to claim 1, wherein the part of greater thickness of the small rod consists of a nut with a locking nut, screwed on said small rod.

3. An apparatus for preparing puree or a similar product, comprising at least one mixing reservoir with a discharge valve, a piston being adapted to be pushed downwards in said reservoir by means of a lever in order to extrude the puree through said discharge valve, wherein the lever acts on the piston rod of the piston via a displacement block of a displacement mechanism operating by wedge action and including a displacement block and a clamping block, the casing of said mechanism being fixedly mounted in vertical direction and the stroke of said lever and therefore of the piston being limited by a stop provided on the clamping block against which a projection of the displacement block abuts, said casing of the displacement mechanism for the piston rod with rod and piston being mounted in the apparatus for horizontal swiveling movement by connection to a swiveling arm.